US012580467B2

(12) United States Patent
Shin et al.

(10) Patent No.: US 12,580,467 B2
(45) Date of Patent: Mar. 17, 2026

(54) CONTINUOUS ZOOM CAMERA APPARATUS

(71) Applicant: SAMSUNG ELECTRO-MECHANICS CO., LTD., Suwon-si (KR)

(72) Inventors: Jun Sup Shin, Suwon-si (KR); Dong Yeon Shin, Suwon-si (KR); Ah Hyeon Im, Suwon-si (KR); Joung Ho Son, Suwon-si (KR); Se Hyeun Yun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 469 days.

(21) Appl. No.: 18/109,666

(22) Filed: Feb. 14, 2023

(65) Prior Publication Data

US 2023/0358995 A1 Nov. 9, 2023

(30) Foreign Application Priority Data

May 3, 2022 (KR) ........................ 10-2022-0054995

(51) Int. Cl.
| | |
|---|---|
| *H02K 41/03* | (2006.01) |
| *G03B 5/00* | (2021.01) |

(Continued)

(52) U.S. Cl.
CPC ........... *H02K 41/0354* (2013.01); *G03B 5/00* (2013.01); *H02K 3/26* (2013.01); *H02K 41/0356* (2013.01);

(Continued)

(58) Field of Classification Search
CPC .... H02K 41/00; H02K 41/003; H02K 41/031; H02K 41/035; H02K 41/0354;

(Continued)

(56) References Cited

U.S. PATENT DOCUMENTS

| | | |
|---|---|---|
| 2020/0127548 A1 | 4/2020 | Yeon et al. |
| 2021/0072495 A1 | 3/2021 | Shin et al. |

(Continued)

FOREIGN PATENT DOCUMENTS

| | | |
|---|---|---|
| KR | 10-2002-0020496 A | 3/2002 |
| KR | 10-2020-0043056 A | 4/2020 |

(Continued)

OTHER PUBLICATIONS

Korean Office Action issued on Apr. 25, 2024, in counterpart Korean Patent Application No. 10-2022-0054995 (10 pages in English, 7 pages in Korean).

*Primary Examiner* — Tran N Nguyen
(74) *Attorney, Agent, or Firm* — NSIP LAw

(57) ABSTRACT

A camera apparatus including a housing; a first lens barrel and a second lens barrel movable in an optical axis direction; first magnet segment regions disposed on a first side of the first lens barrel and second magnet segment regions disposed on a second side of the second lens barrel; and a plurality of first driving coils disposed on a first side of the housing and a plurality of second driving coils disposed on a second side of the housing. A width of one of the first driving coils or one of the second driving coils along the optical axis direction is greater than or equal to a width of one of the first magnet segment regions or the second magnet segment regions along the optical axis direction.

28 Claims, 10 Drawing Sheets

(51) Int. Cl.

| | | |
|---|---|---|
| *H02K 3/26* | (2006.01) | |
| *H02K 41/035* | (2006.01) | |
| *G02B 7/09* | (2021.01) | |

(52) U.S. Cl.
CPC ........ *G02B 7/09* (2013.01); *G03B 2205/0046* (2013.01); *G03B 2205/0069* (2013.01); *H02K 2203/03* (2013.01)

(58) Field of Classification Search
CPC ... H02K 3/00; H02K 3/26; G02B 7/00; G02B 7/08; G02B 7/09; G02B 7/10; G02B 7/102; G02B 13/00; G02B 13/009; G02B 13/0045; G02B 13/0065; G02B 13/16; G02B 13/36; G02B 15/143; G02B 15/143103; G03B 13/00; G03B 13/36; G03B 30/00; G03B 3/00; G03B 3/10; G03B 5/00; G03B 17/00; G03B 17/02; G03B 17/17; H04N 23/00; H04N 23/45; H04N 23/51; H04N 23/54; H04N 23/55; H04N 23/67; H04N 23/69; H04N 5/2252; H04N 5/2253

See application file for complete search history.

(56) References Cited

U.S. PATENT DOCUMENTS

| | | |
|---|---|---|
| 2022/0046151 A1 | 2/2022 | Shabtay et al. |
| 2023/0296964 A1 | 9/2023 | Park et al. |

FOREIGN PATENT DOCUMENTS

| | | | | |
|---|---|---|---|---|
| KR | 10-2021-0030724 A | | 3/2021 | |
| KR | 20210048037 A | * | 5/2021 | ............. G03B 13/36 |
| KR | 10-2021-0113318 A | | 9/2021 | |
| KR | 10-2022-0042528 A | | 4/2022 | |

* cited by examiner

CG1, CG2, CG3, CG4 : INDIVIDUAL COIL CENTER
MG : CENTER OF ALL MAGNETS

CG1, CG2, CG3, CG4 : INDIVIDUAL COIL CENTER
MG : CENTER OF ALL MAGNETS

CG1, CG2, CG3, CG4 : INDIVIDUAL COIL CENTER
MG : CENTER OF ALL MAGNETS

LENS BARREL MOVEMENT DISTANCE [mm]

LENS BARREL MOVEMENT DISTANCE [mm]

CONTINUOUS ZOOM CAMERA APPARATUS

CROSS-REFERENCE TO RELATED APPLICATION(S)

This application claims the benefit under 35 USC 119 (a) of Korean Patent Application No. 10-2022-0054995 filed on May 3, 2022 in the Korean Intellectual Property Office, the entire disclosure of which is incorporated herein by reference for all purposes.

BACKGROUND

Field

The following description relates to a continuous zoom camera apparatus.

Description of the Background

In general, camera apparatuses may include a periscope type camera module including a prism and having a long stroke driving distance or a folded type optical camera module.

Also, camera apparatuses may include a camera module having a fixed magnification method, which may include a camera module of a digital zoom method to which a digital cropping method is applied at a magnification other than X5 or X10 magnification.

Such a digital zoom camera module has relatively high noise or deterioration in image quality, compared to an optical zoom method, so a continuous zoom camera apparatus manufactured to have a relatively longer driving distance than the existing optical zoom method is required.

An optical zoom camera apparatus having a short driving distance may include a pair of coils and a pair of magnets to correspond to the short driving distance.

In contrast, a continuous zoom camera apparatus having a relatively long driving distance may include two or more pairs of coils and two or more pairs of magnets to correspond to the long driving distance.

In the existing continuous zoom camera apparatus, driving force may be determined by a distance between coils and a size of the coils and magnets.

However, in the existing continuous zoom camera apparatus, the size of the coils and the magnets are not uniform, and the distance between the coils is not uniform, resulting in a difference in the distance between driving sequences determined by the coil and the magnet, and thus the driving force may be degraded.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera apparatus includes: a housing defining an accommodating space and an opening therein; a lens assembly including a first lens barrel and a second lens barrel disposed in the accommodating space and configured to be movable in an optical axis direction; a first polarization magnet including first magnet segment regions disposed on a first side of the first lens barrel with respect to the optical axis direction and a second polarization magnet including second magnet segment regions disposed on a second side of the second lens barrel with respect to the optical axis direction; and a first coil unit including a plurality of first driving coils disposed on a first side of the housing to face the first polarization magnet through the opening of the housing and a second coil unit including a plurality of second driving coils disposed on a second side of the housing to face the second polarization magnet through the opening of the housing. A width of one of the first driving coils or one of the second driving coils along the optical axis direction is greater than or equal to a width of one of the first magnet segment regions or the second magnet segment regions along the optical axis direction.

The first polarization magnet may include an odd number of first magnet segment regions, and the first polarization magnet may have a bilateral symmetrical structure with respect to a center of a central magnet segment region among the plurality of first magnet segment regions. The second polarization magnet may include an odd number of second magnet segment regions, and the second polarization magnet may have a bilateral symmetrical structure with respect to a center of a central magnet segment region among the plurality of second magnet segment regions.

The first polarization magnet may include an odd number of first magnet segment regions, and when the first polarization magnet is located at either one of both ends of an entire driving section of the first polarization magnet, a center of a central magnet segment region, among the plurality of first magnet segment regions, may coincide with a center of the respective first driving coil facing the central magnet segment region. The second polarization magnet may include an odd number of second magnet segment regions, and when the second polarization magnet is located at either one of both ends of an entire driving section of the second polarization magnet, a center of a central magnet segment region, among the plurality of second magnet segment regions, may coincide with a center of the respective second driving coil facing the central magnet segment region.

Each of the plurality of first driving coils may have a same width and/or each of the plurality of second driving coils may have a same width, and each of the plurality of first magnet segment regions may have a same width and/or each of the plurality of second magnet segment regions may have a same width.

Gaps between adjacent first driving coils, among the plurality of first driving coils, may be the same as each other, and/or gaps between adjacent second driving coils, among the plurality of second driving coils, may be the same as each other.

An interval ratio between adjacent first driving coils, among the plurality of first driving coils, may fall within a first preset ratio range, and/or an interval ratio between adjacent second driving coils, among the plurality of second driving coils, may fall within a second preset ratio range.

The camera apparatus may include a prism configured to change incident light from an incident axis to the optical axis direction.

The plurality of first driving coils may be individual coil components in which one first driving coil is mounted on an individual substrate or printed circuit board (PCB) coils arranged in a row on one PCB, and/or the plurality of second driving coils may be individual coil components in which one second driving coil is mounted on an individual substrate or printed circuit board (PCB) coils arranged in a row on one PCB.

The first lens barrel may include a first side surface portion disposed on the first side of the first lens barrel with respect to the optical axis direction and a second side surface portion disposed on s second side of the first lens barrel with respect to the optical axis direction, and a length of the first side surface portion of the first lens barrel along the optical axis direction may be greater than a length of the second side surface portion of the first lens barrel along the optical axis direction.

The second lens barrel may include a first side surface portion disposed on a first side of the second lens barrel with respect to the optical axis direction and a second side surface portion disposed on the second side of the second lens barrel with respect to the optical axis direction, and a length of the second side surface portion of the second lens barrel along the optical axis direction may be greater than a length of the first side surface portion of the second lens barrel along the optical axis direction.

The first side surface portion of the first lens barrel may extend toward the second lens barrel, and the second side surface portion of the second lens barrel may extend toward the first lens barrel.

The first polarization magnet may be disposed on the first side surface portion of the first lens barrel, and the second polarization magnet may be disposed on the second side surface portion of the second lens barrel.

The first side surface portion of the first lens barrel may be disposed on a side opposite to the second side surface portion of the second lens barrel with respect to an optical axis passing through the lens assembly.

Each of the plurality of first driving coils may be offset in a direction of a first incident axis, and/or each of the plurality of second driving coils may be offset in a direction of a second incident axis.

In another general aspect, a camera apparatus includes: a housing defining an accommodating space and an opening therein; a lens assembly including a first lens barrel and a second lens barrel disposed in the accommodating space and configured to be movable in an optical axis direction; a first polarization magnet including first magnet segment regions disposed on a first side of the first lens barrel with respect to the optical axis direction and a second polarization magnet including second magnet segment regions disposed on a second side of the second lens barrel with respect to the optical axis direction; a first coil unit including a plurality of first driving coils disposed on a first side of the housing to face the first polarization magnet through the opening of the housing and a second coil unit including a plurality of second driving coils disposed on a second side of the housing to face the second polarization magnet through the opening of the housing; and a circuit unit configured to control driving of the first coil unit and the second coil unit. A width of one of the first driving coils or one of the second driving coils along the optical axis direction is greater than or equal to a width of one of the first magnet segment regions or the second magnet segment regions along the optical axis direction.

Other features and aspects will be apparent from the following detailed description, the drawings, and the claims.

4

Figure 2:
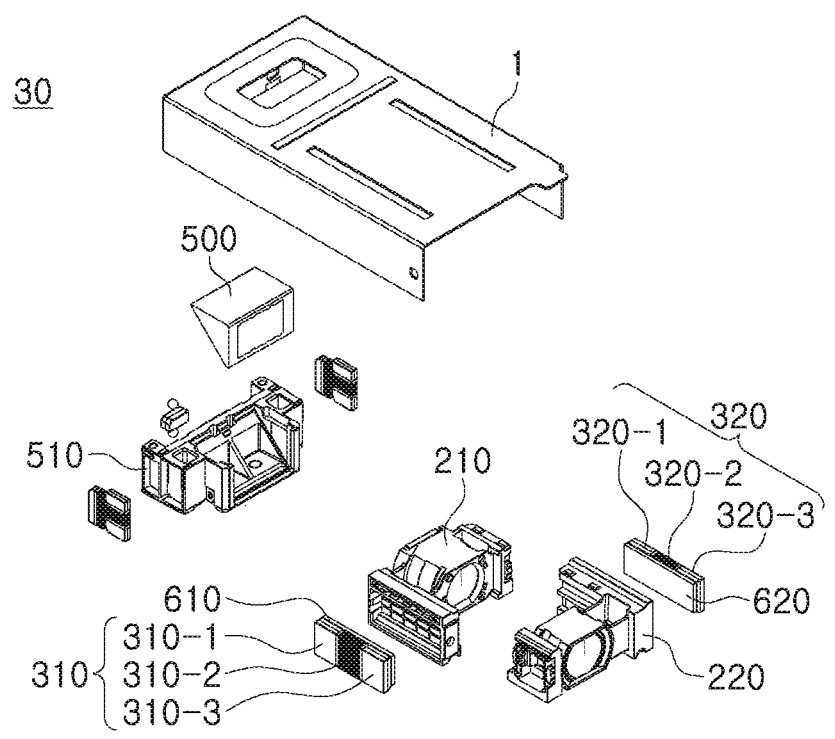
Figure 2:
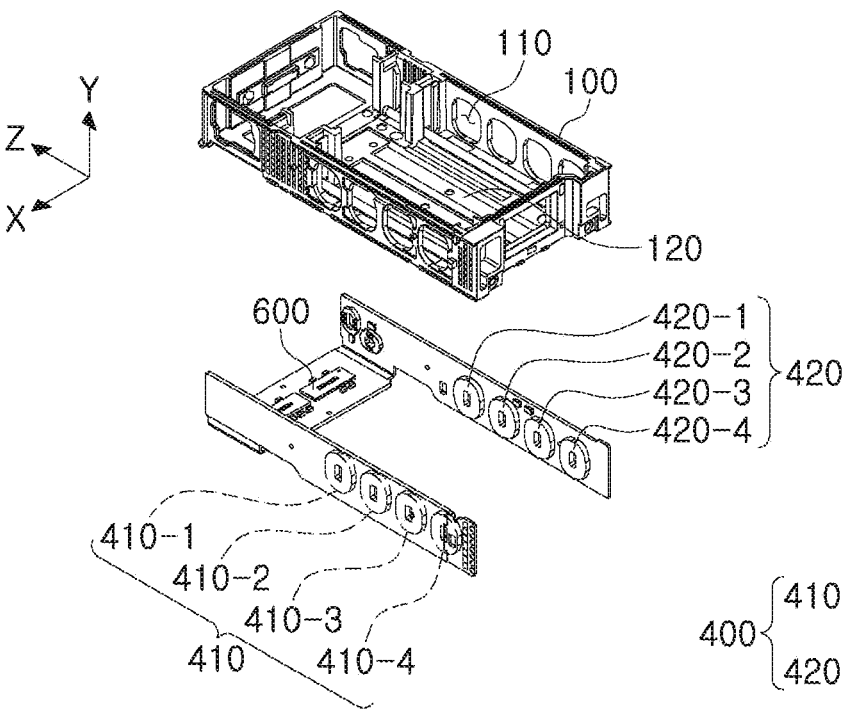

FIG. 2 is an exploded perspective view illustrating a continuous zoom camera apparatus according to an example.

Figure 3:
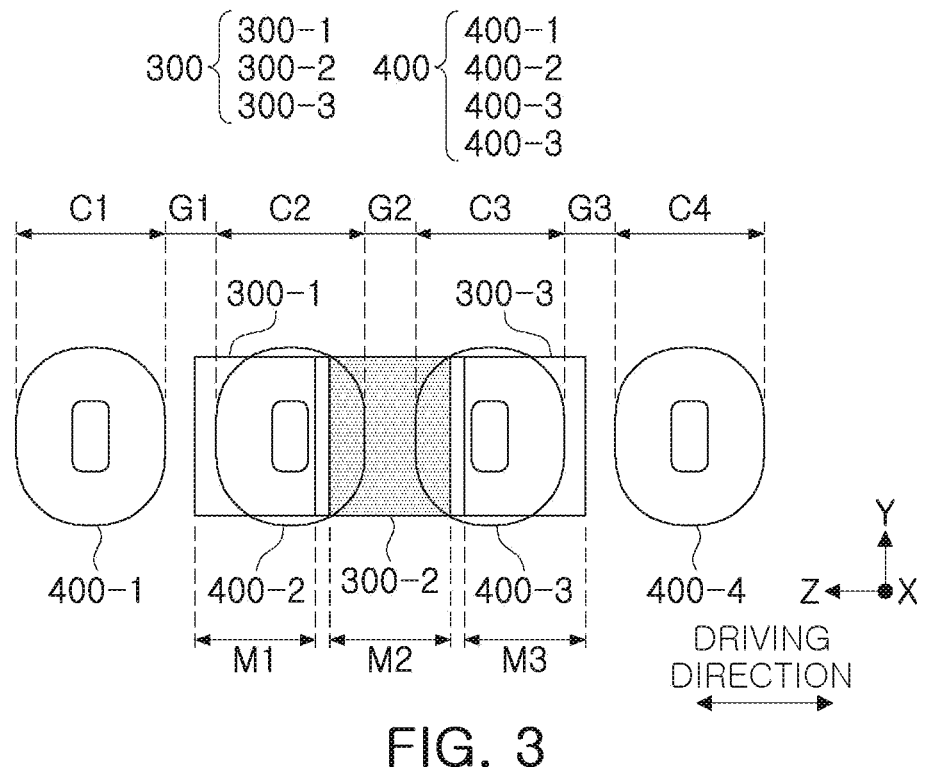

FIG. 3 is a view illustrating a width between a plurality of coils of a coil unit and a magnet segment region.

Figure 4:
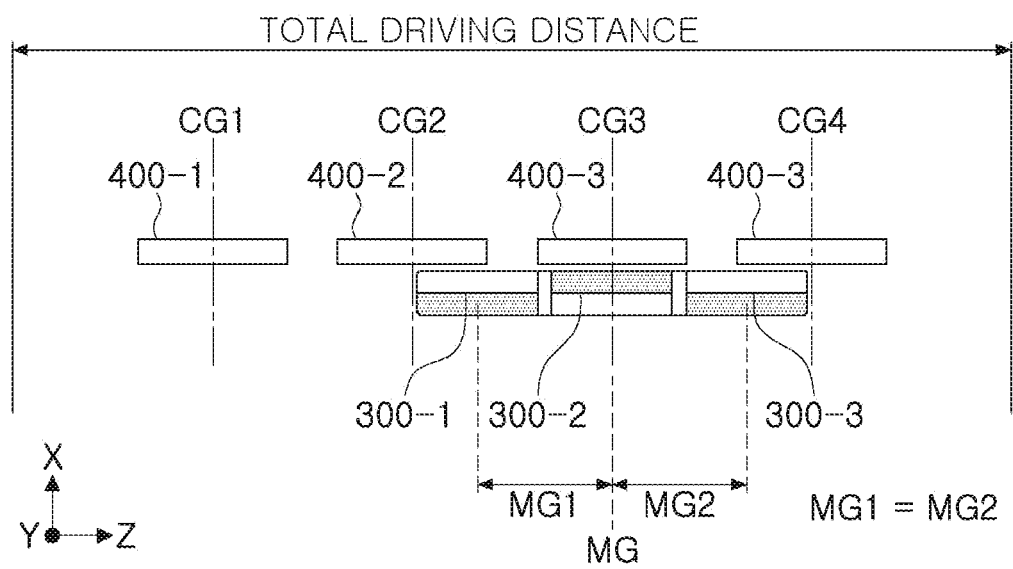

FIG. 4 is a view illustrating a bilateral symmetrical structure with respect to the center of a central magnet segment region, among a plurality of magnet segment regions.

Figure 5A:
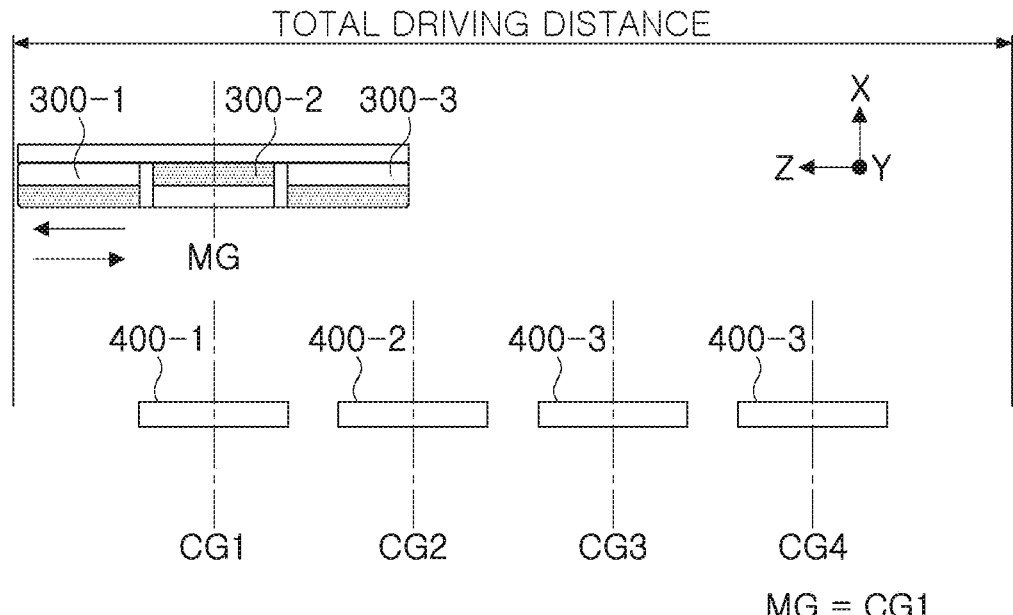
Figure 5B:
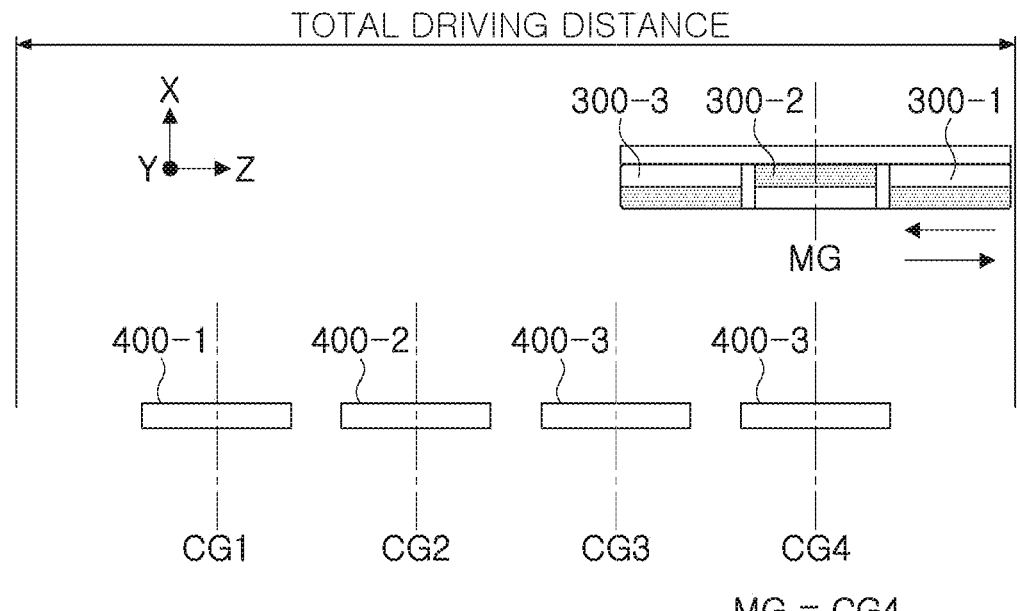

FIGS. 5A and 5B are views illustrating a structure in which the center of a central magnet segment region, among a plurality of magnet segment regions, coincides with the center of a corresponding coil.

Figure 6:
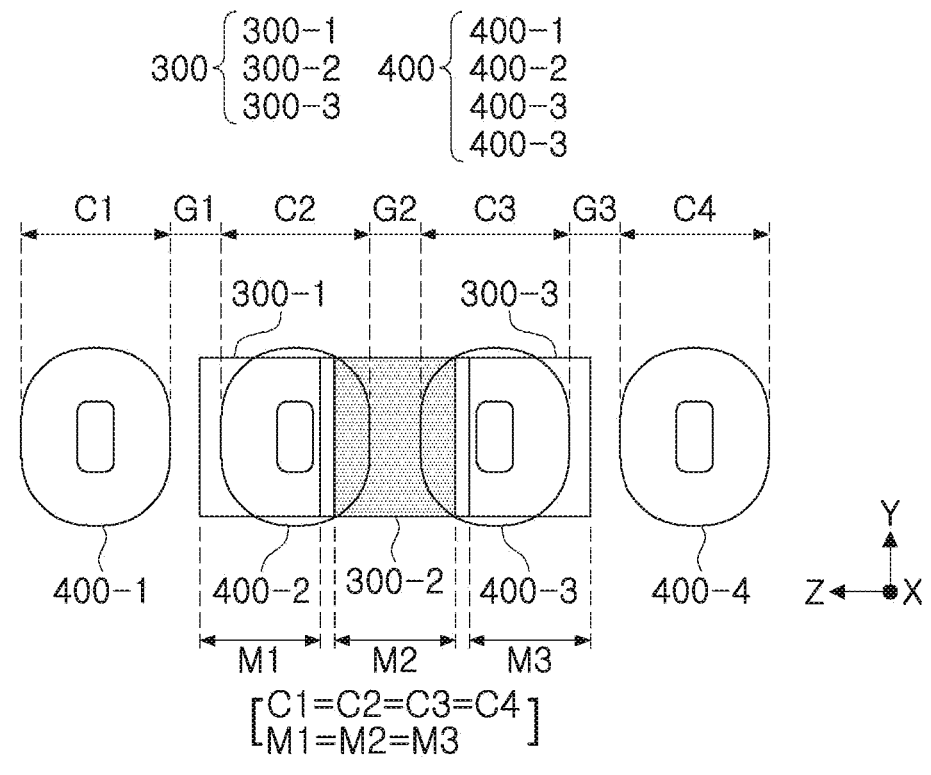

FIG. 6 is a view illustrating sizes of a plurality of coils of a coil unit.

Figure 7:
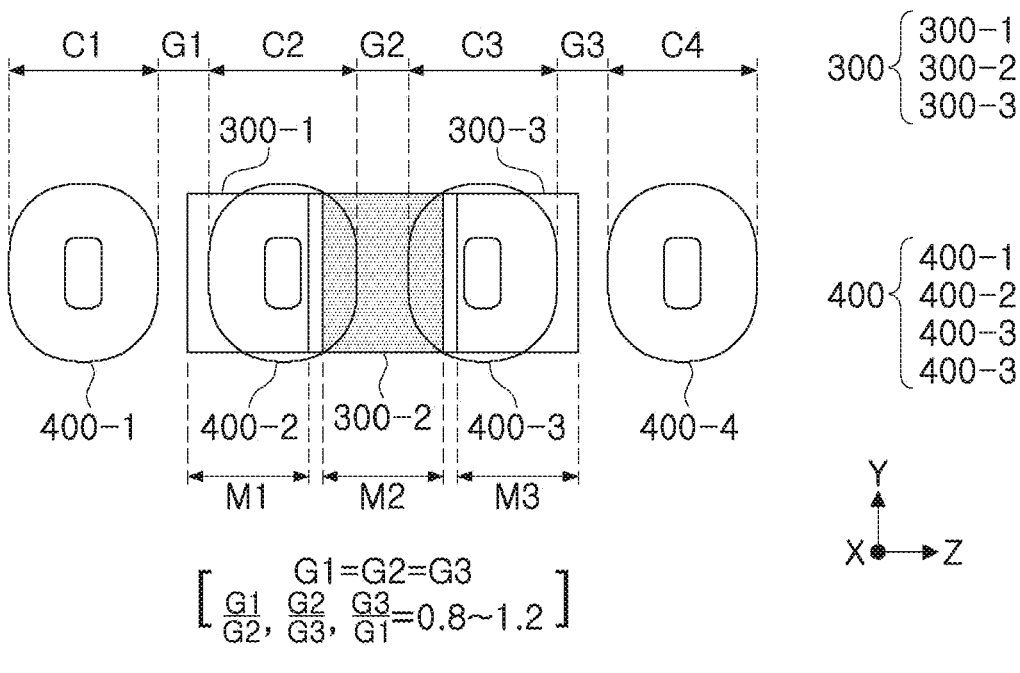

FIG. 7 is a view illustrating a gap between coils of a coil unit.

Figure 8A:
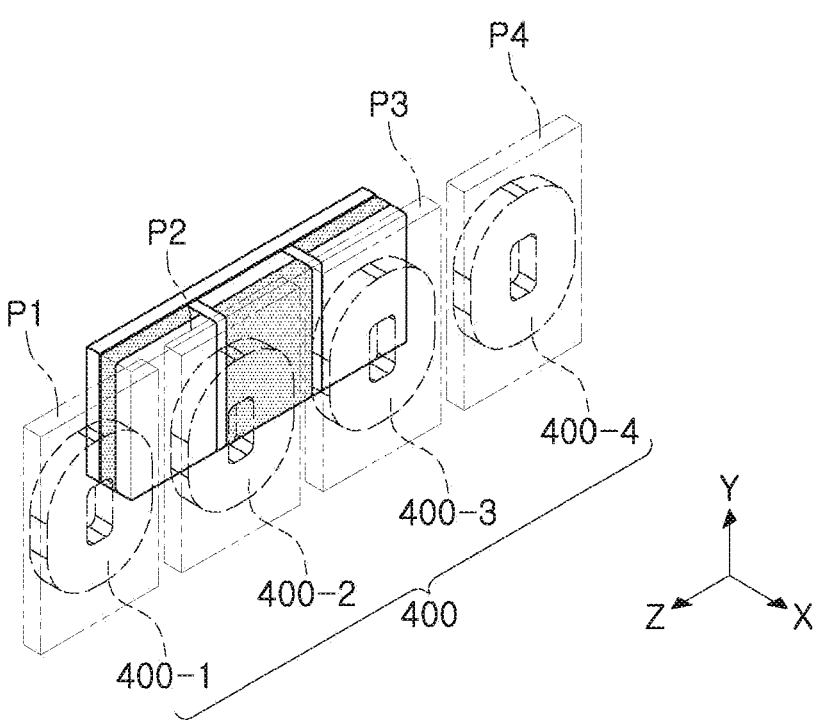

FIG. 8A is a view illustrating an individual coil component of a coil unit.

Figure 8B:
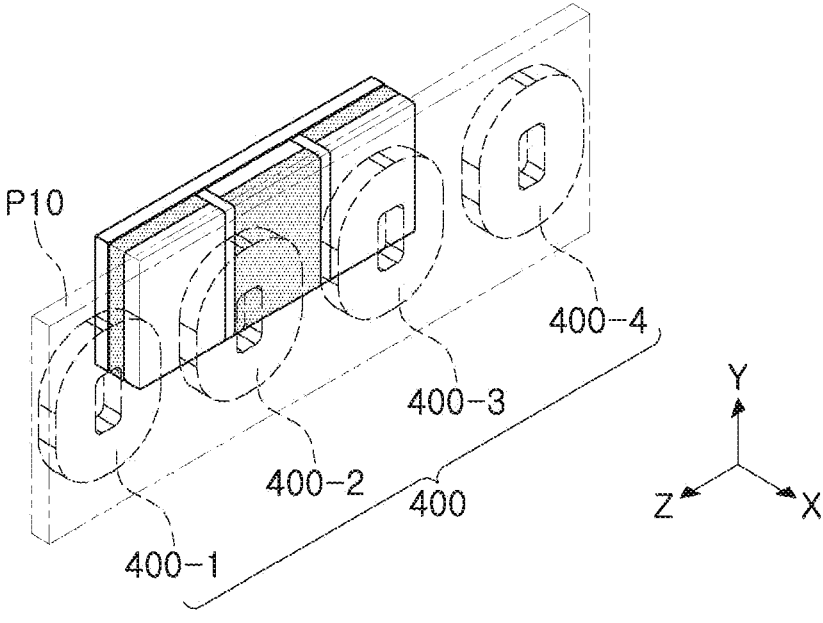

FIG. 8B is a view illustrating a PCB coil of a coil unit.

Figure 9:
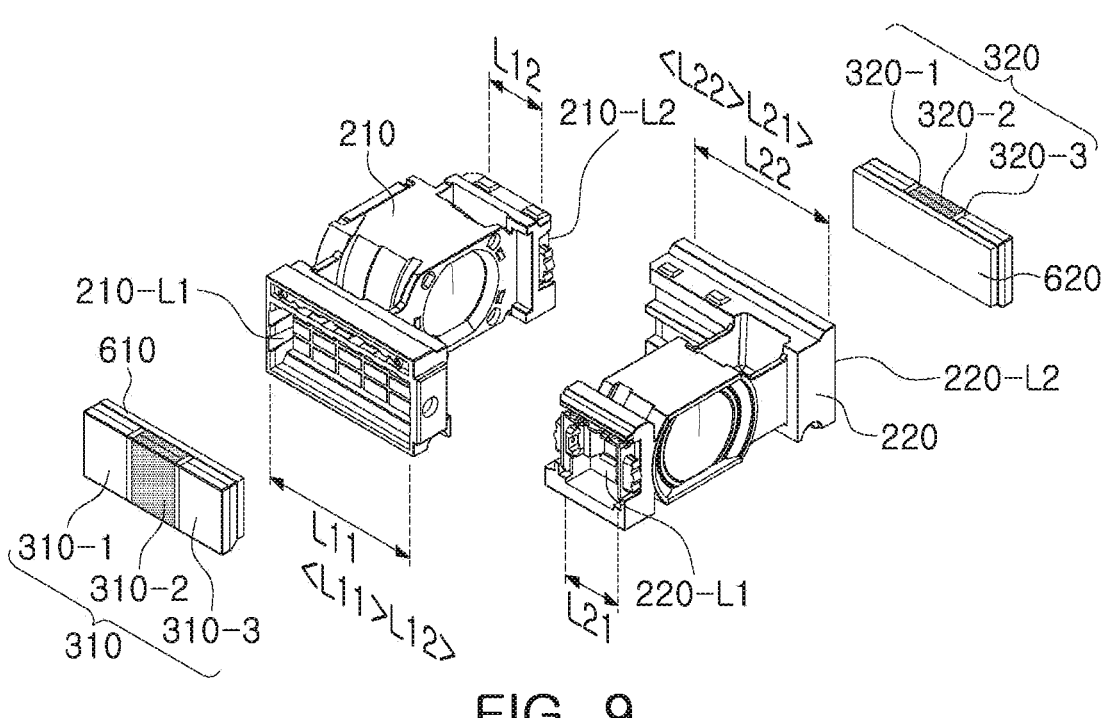

FIG. 9 is a view illustrating a first lens barrel and a second lens barrel.

Figure 10:
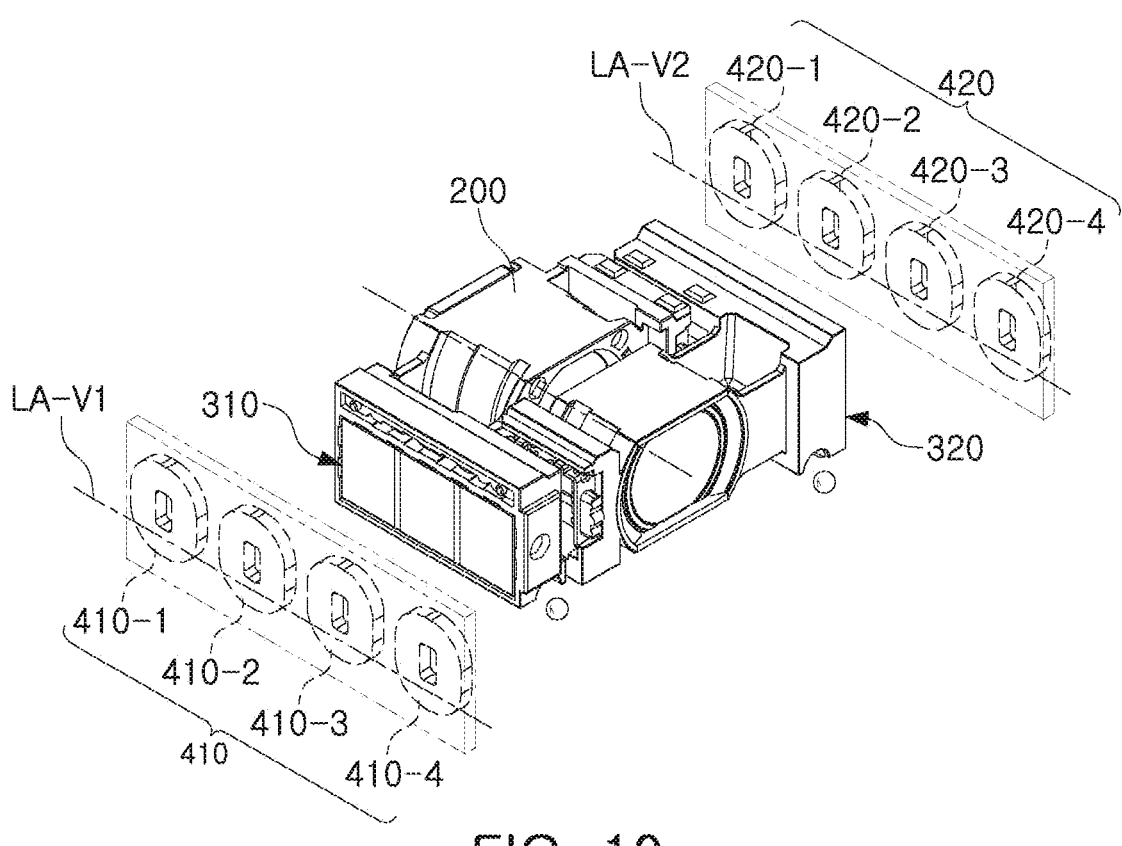

FIG. 10 is a view illustrating a first coil unit and a second coil unit.

Figure 11A:
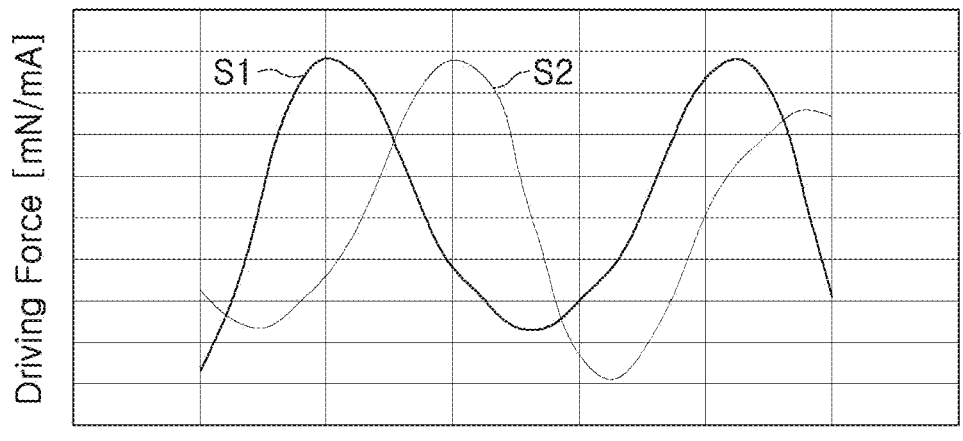

FIG. 11A is a view illustrating a driving signal of a coil when a coil gap is not uniform.

Figure 11B:
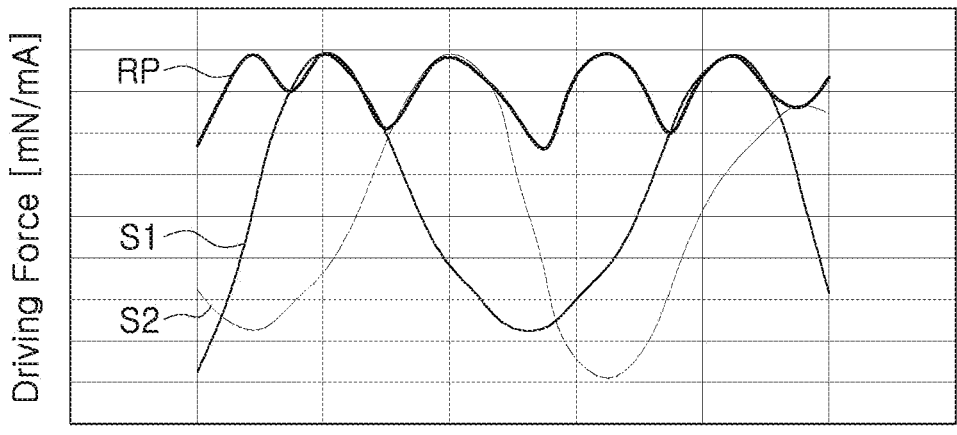

FIG. 11B is a view illustrating a ripple of a driving signal when a coil gap is not uniform.

Figure 12A:
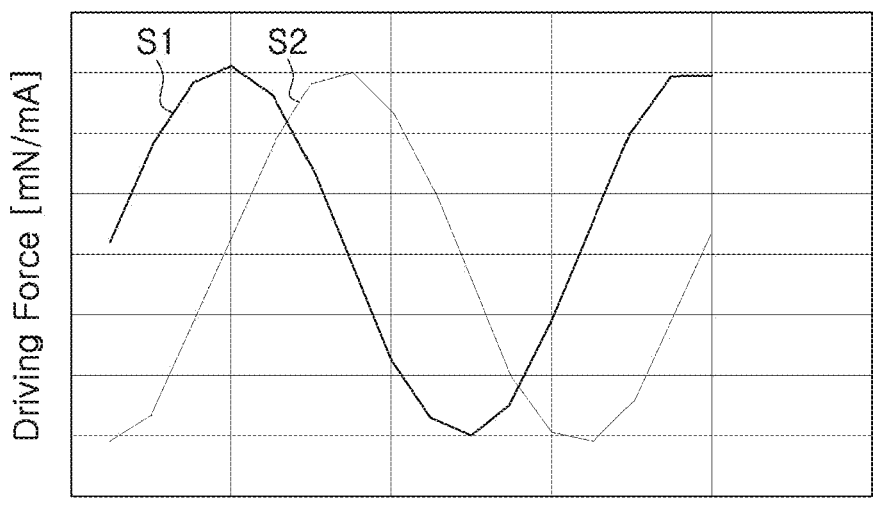

FIG. 12A is a view illustrating a driving signal of a coil when a coil gap is uniform.

Figure 12B:
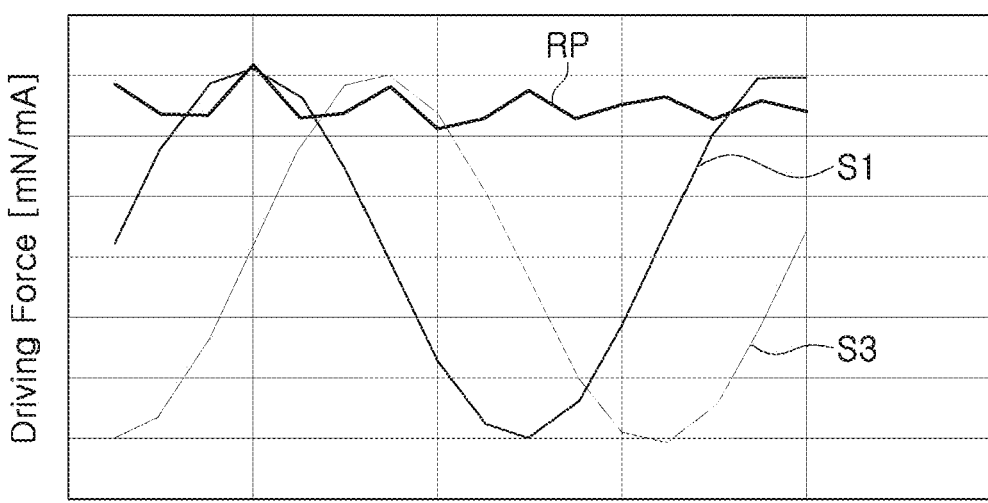

FIG. 12B is a view illustrating a ripple of a driving signal when the coil gap is uniform.

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Figure 1A:
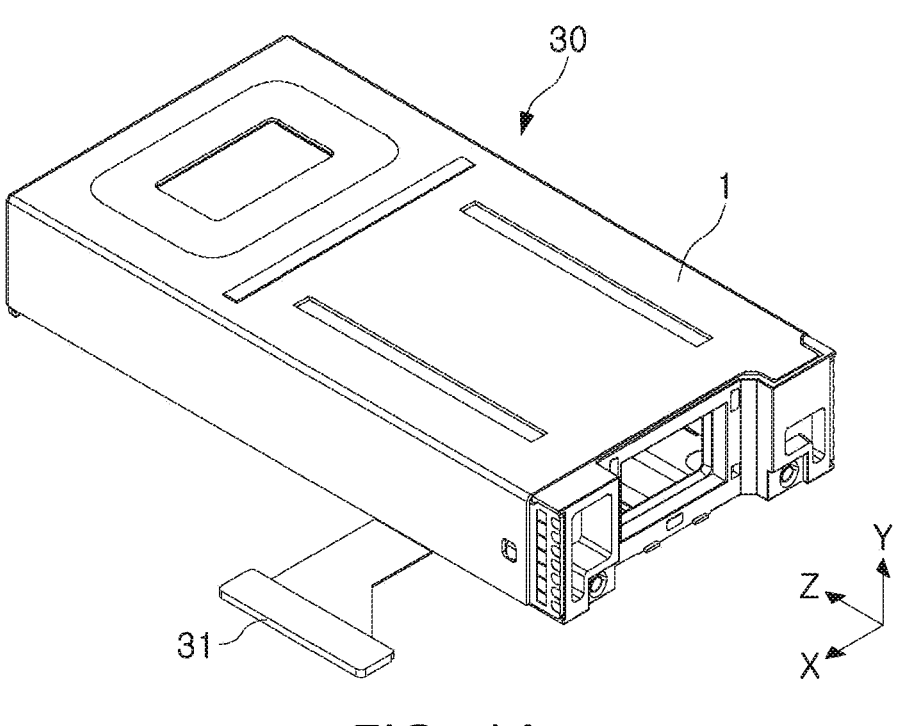
FIG. 1A is a view illustrating the exterior of a continuous zoom camera apparatus according to an example.
Figure 1B:
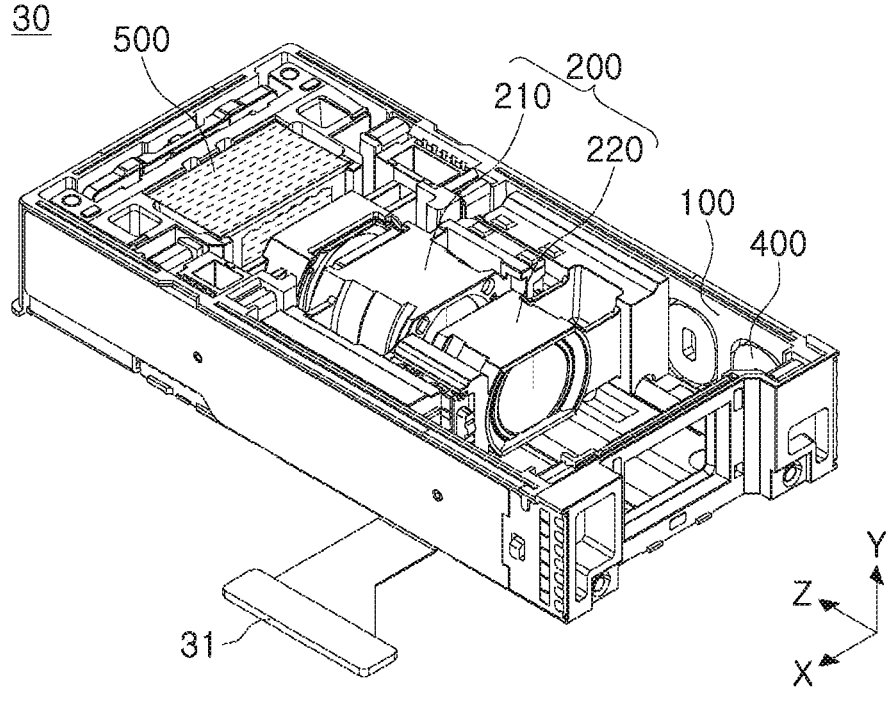
FIG. 1B is a view illustrating an internal configuration of a continuous zoom camera apparatus.
Figure 1C:
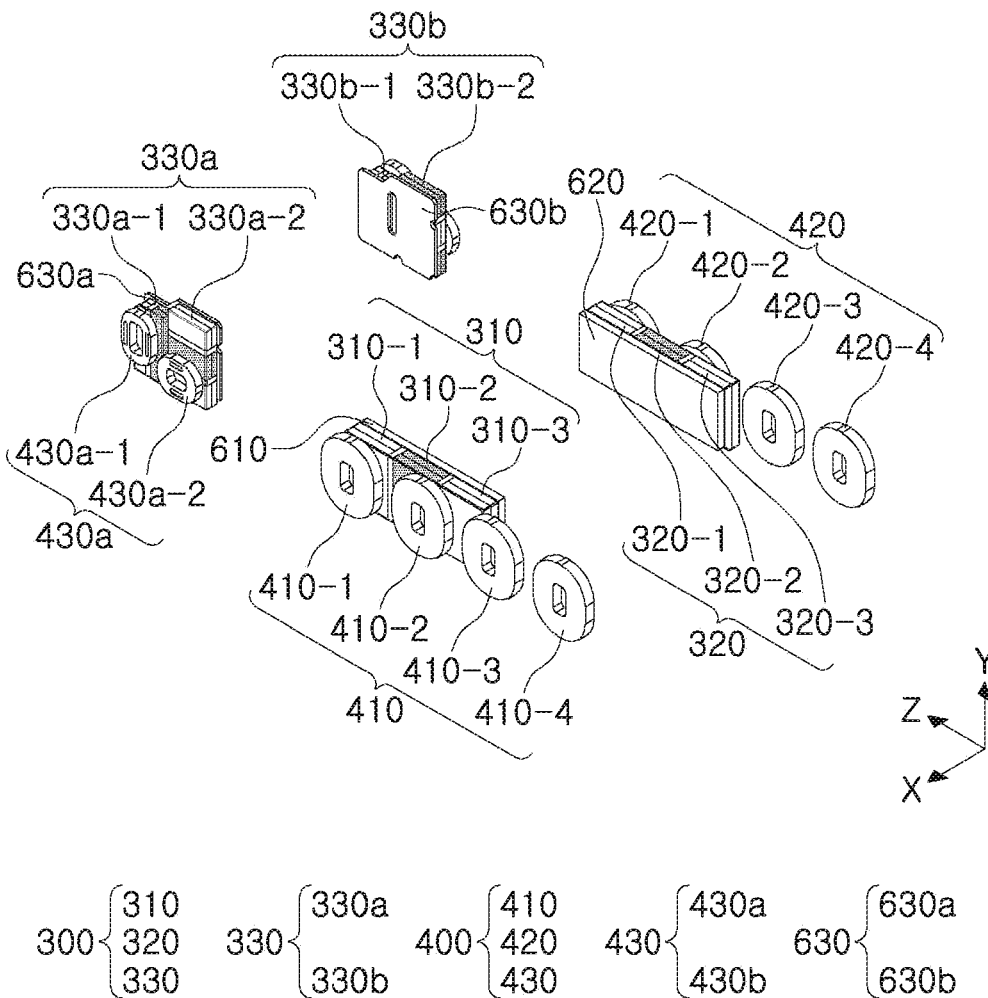
FIG. 1C is a view illustrating a coil unit and a magnet unit.

FIG. 1A is a view illustrating the exterior of a continuous zoom camera apparatus according to an example, FIG. 1B is a view illustrating an internal configuration of a continuous zoom camera apparatus, and FIG. 1C is a view illustrating a coil unit and a magnet unit.

Referring to FIG. 1A, a continuous zoom camera apparatus 30 may include a shield can 1 and a connector 31 for connection with other devices. As an example, the other devices may be a control circuit of a vehicle.

Referring to FIG. 1B, the continuous zoom camera apparatus 30 may include the shield can 1 (a housing 100, a lens assembly 200, and a magnet unit 300 (FIG. 1C)) inside FIG. 1A), and a coil unit 400. Also, the continuous zoom camera apparatus 30 may include a prism 500.

The housing 100 may be a skeleton frame and a support frame for disposing the magnet unit 300 and the coil unit 400.

The lens assembly 200 may include a first lens barrel 210 and a second lens barrel 220. For example, the lens assembly 200 may include a first lens barrel 210 including a plurality of zoom lenses and a second lens barrel 220 including a plurality of auto-focusing (AF) lenses. For example, the first lens barrel 210 may be a zoom lens barrel including a plurality of zoom lenses, and the second lens barrel 220 may be an AF lens barrel including a plurality of AF lenses.

The magnet unit 300 may include a first polarization magnet 310 and a second polarization magnet 320. The first polarization magnet 310 may be disposed on one side of the first lens barrel 210 of the lens assembly 200, and the second polarization magnet 320 may be disposed on the other side of the second lens barrel 220 of the lens assembly 200, and the first polarization magnet 310 and the second polarization magnet 320 may move the first lens barrel 210 and the second lens barrel 220 of the lens assembly 200 upon receiving driving force from the coil unit 400. One side of the first lens barrel 210 may be opposite to the other side of the second lens barrel 220 based on the optical axis passing through the lens assembly 200 (for example, the Z-axis direction as illustrated in the drawings).

The coil unit 400 may include a first coil unit 410 and a second coil unit 420. The first coil unit 410 may be disposed on one side of the housing 100 and the second coil unit 420 may be disposed on the other side of the housing 100. The first coil unit 410 and the second coil unit 420 may be driven according to a driving signal supplied from a circuit unit 600 (FIG. 2) to provide driving force to the first polarization magnet 310 and the second polarization magnet 320 of the magnet unit 300, respectively.

For example, the circuit unit 600 may drive a plurality of coil units with one driving IC, but as another example, the circuit unit 600 may include a plurality of driving units for respectively driving the plurality of coil units.

In the examples discussed herein, the driving force may be electromagnetic force formed in the coil unit 400 and affecting the magnet unit 300. For example, based on a principle that the lens assembly 200 on which the magnet unit 300 is disposed moves in a driving direction as the magnet unit 300 moves by electromagnetic force generated by the coil unit 400, the corresponding lens unit in which the corresponding magnet unit is disposed may be moved by each coil unit. In general, a movement direction may be determined according to a direction of a current flowing through each coil unit.

Referring to FIG. 1C, the magnet unit 300 may include the first polarization magnet 310 disposed on one side of the first lens barrel 210 of the lens assembly 200 and the second polarization magnet 320 disposed on the other side of the second lens barrel 220, and third polarization magnets 330 (330a and 330b) disposed on both sides of the prism 500.

For example, the first polarization magnet 310 may include three magnet segment regions 310-1, 310-2, and 310-3 in which the N pole and the S pole are alternately repeated, the second polarization magnet 320 may include three magnet segment regions 320-1, 320-2, and 320-3 in which the N pole and the S pole are alternately repeated. However, the first polarization magnet 310 and the second polarization magnet 320 are not limited to the arrangement/configuration shown in the above example.

One magnet 330a of the third polarization magnet 330 (330a, 330b) may include two magnet segment regions 330a-1 and 330a-2 for positional movement in different directions (e.g., a Z-axis direction and a Y-axis direction) and a neutral zone (NZ) (non-polarized zone) therebetween, and the other magnet 330b of the third polarization magnet 330 (330a, 330b) may include two magnet segment regions 330b-1 and 330b-2 for positional movement in different direction (e.g., the Z-axis direction, the Y-axis direction) and a neutral zone therebetween.

For example, the plurality of magnet segment regions 330a-1 and 330b-1 of the third polarization magnet 330 may be magnet segment regions for driving the prism 500 in one direction (e.g., the Z-axis), and the plurality of magnet segment regions 330a-2 and 330b-2 of the third polarization magnet 330 may be magnet segment regions for driving the prism 500 in one direction (e.g., the Y-axis).

For example, each of the plurality of magnet segment regions 320-1, 320-2, and 320-3 of the first polarization magnet 310 may have an N pole on one side and an S pole on the other side.

In the examples discussed herein, with respect to the plurality of magnet segment regions included in the first polarization magnet or the second polarization magnet, the magnet segment region refers to a polar region magnetized to the S pole or the N pole.

The coil unit 400 may include a first coil unit 410 disposed to face the first polarization magnet 310 and providing driving force to the first polarization magnet 310, a second coil unit 420 disposed to face the second polarization magnet 320 and provide driving force to the second polarization magnet 320, and third coil units 430a and 430b disposed to face the third polarization magnets 330a and 330b, respectively, to provide driving force to the third polarization magnets 330a and 330b.

For example, the first coil unit 410 may include four driving coils 410-1, 410-2, 410-3, and 410-4 disposed in the housing 100 (FIG. 1B) in a row in the driving direction, and provide driving force to the first polarization magnet 310 disposed in the first lens barrel 210 according to a received driving signal.

The second coil unit 420 may include four driving coils 420-1, 420-2, 420-3, and 420-4 disposed in the housing 100 (FIG. 1B) in a row in the driving direction, and may provide driving force to the second polarization magnet 320 disposed in the second lens barrel 220 according to a received driving signal.

One coil unit 430a, among the third coil units 430a and 430b, may include two coils 430a-1 and 430a-2, may operate in synchronization with the coil unit 430b, and may provide driving force to one magnet 330a of the polarization magnets 330 (330a, 330b), and accordingly, the position of the prism 500 may be adjusted.

Among the third coil units 430a and 430b, the other coil unit 430b may include two coils 430b-1 and 430b-2, may operate in synchronization with the coil unit 430a, and may provide driving force to the other magnet 330b of the third polarization magnet 330 (330a, 330b), and accordingly, the position of the prism 500 may be adjusted.

Each of the first polarization magnet 310 and the second polarization magnet 320 may be firmly attached to the first lens unit 210 and the second lens unit 220 of the lens assembly 200 through a first yoke 610 and a second yoke 620, and each of the first yoke 610 and the second yoke 620 may block leakage magnetic flux. In addition, each of the third polarization magnets 330 (330a, 330b) may be firmly attached to both sides of a holder 510 (FIG. 2) of the prism through a third yoke 630 (630a, 630b), and the third yoke 630 (630a, 630b) may block leakage magnetic flux.

For each of the drawings, unnecessary redundant descriptions of the components having the same reference numerals and the same functions may be omitted, and differences may be described for each drawing.

FIG. 2 is an exploded perspective view illustrating a continuous zoom camera apparatus according to an example.

Referring to FIG. 2, the housing 100 may include an accommodating space 120 formed therein and an opening 110 including a plurality of openings disposed on the side thereof. For example, each opening of the opening 110 is for accommodating a corresponding coil, and the number of openings of the opening 110 may correspond to the number of coils.

The continuous zoom camera apparatus 30 may include the circuit unit 600. For example, the circuit unit 600 may control driving of the coil unit 400. For example, the circuit unit 600 may be connected to other devices through the connector 31 (FIG. 1A).

Referring to FIGS. 1B, 1C and 2, the first lens barrel 210 and the second lens barrel 220 of the lens assembly 200 may be accommodated in the accommodating space 120 of the housing 100. A plurality of driving coils of the first coil unit 410 and the second coil unit 420 may be disposed in the plurality of openings of the opening 110 of the housing 100.

The lens assembly 200 may include the first lens barrel 210 and the second lens barrel 220 movably disposed in the accommodating space 120 of the housing 100 in an optical axis direction. For example, the first lens barrel 210 may be a zoom lens barrel including a plurality of zoom lenses, and the second lens barrel 220 may be an AF lens barrel including a plurality of AF lenses.

The magnet unit 300 includes the first polarization magnet 310 and the second polarization magnet 320 including a plurality of magnet segment regions in which the N pole and the S pole are alternately arranged on a side surface in the optical axis direction, which is a driving direction.

In the various examples, each of the first polarization magnet 310 and the second polarization magnet 320 of the magnet unit may include at least two magnet segment regions (e.g., N pole and S pole) and a neutral zone disposed between the two magnet segment regions.

For example, as shown in FIG. 2, the first polarization magnet 310 may include three magnet segment regions 310-1, 310-2, and 310-3 in which the N pole and the S pole are alternately arranged on a side surface. In addition, the second polarization magnet 320 may include three magnet segment regions 320-1, 320-2, and 320-3 in which the N pole and the S pole are alternately arranged on a side surface. The configuration of the first and second polarization magnets 310 and 320 are not limited to the above examples. In particular, examples of the arrangement structure and number in the various examples are only for convenience of description and are not limited thereto.

The coil unit 400 may include a plurality of driving coils disposed in the driving direction in the opening 110 of the housing 100 to face the magnet unit 300 through the opening 120.

For example, in the present example, the coil unit 400 may include a first coil unit 410 and a second coil unit 420. For example, the first coil unit 410 may include a plurality of driving coils 410-1 to 410-4 disposed on a side surface of the housing 100 to face the first polarization magnet 310 through the opening(s) 110 of the housing 100. The second coil unit 420 may include a plurality of driving coils 420-1 to 420-4 disposed on the other side surface of the housing 100 to face the second polarization magnet 320 through the opening(s) 110 of the housing 100.

For example, each of the first coil unit 410 and the second coil unit 420 may include at least two driving coils.

For example, as shown in FIG. 2, the first coil unit 410 may include four driving coils 410-1, 410-2, 410-3, and 410-4. Also, the second coil unit 420 may include four driving coils 420-1, 420-2, 420-3, and 420-4.

Hereinafter, in the description of the various examples, the coil unit 400 may be at least any one of the first coil unit 410 and the second coil unit 420, and the magnet unit 300 may be at least any one of the first polarization magnet 310 and the second polarization magnet 320. In the following, the plurality of driving coils 400-1, 400-2, . . . may be a driving coil included in the first coil unit 410 or the second coil unit 420, and the plurality of magnet segment regions 300-1, 300-2, . . . may be a magnet segment region included in the first polarization magnet 310 or the second polarization magnet 320.

For example, the prism 500 may be disposed in the prism holder 510 on which the third polarization magnets 330a and 330b are disposed, and may be driven by the third coil units 430a and 430b to change incident light from an incident axis (e.g., the Y-axis among the X, Y, and Z-axes) to the optical axis direction (e.g., the Z-axis direction, among X, Y, and Z-axis directions). For example, the optical axis direction may be the driving axis direction, but is not limited thereto.

FIG. 3 is a view illustrating a width between a plurality of coils of a coil unit and a magnet segment region.

In the following description, any one of the first coil unit 410 and the second coil unit 410 of the coil unit 400 and any one of the first polarization magnet 310 and the second polarization magnet 320 of the magnet unit 300 will be described as an example, but this is for convenience of description and understanding, and the description may be applied to any one of the first coil unit 410 and the second coil unit 420 of the coil unit 400 and any one of the first polarization magnet 310 and the second polarization magnet 320 of the magnet unit 300.

Referring to FIG. 3, for example, in order to improve driving force between the coil unit 400 and the magnet unit 300, a width (e.g., C1, among C1, C2, C3, and C4) of any one of the plurality of driving coils 400-1, 400-2, 400-3, and 400-4 included in the first coil unit 410 or the second coil unit 420 and having a height and a width may be greater than or equal to a width (e.g., M1, among M1, M2, and M3) of any one of the plurality of magnet segment regions 300-1, 300-2, and 300-3 of the first polarization magnet 310 or the second polarization magnet 320 (C1≥M1).

FIG. 4 is a view illustrating a bilateral symmetrical structure with respect to the center of a central magnet segment region, among a plurality of magnet segment regions.

Referring to FIG. 4, in a structure including an odd number of the plurality of magnet segment regions 300-1, 300-2, and 300-3, the first polarization magnet 310 or the second polarization magnet 320 may include a bilateral symmetrical structure based on the center (the center of all magnets) MG of a central magnet segment region 300-2, among the plurality of magnet segment regions 300-1, 300-2 and 300-3.

For example, when the first polarization magnet 310 or the second polarization magnet 320 includes three magnet polarization areas 300-1, 300-2, and 300-3, the first polarization magnet 310 or the second polarization magnet 320 may have a symmetrical structure in which distances to the center of the left and right magnet segment regions 300-1 and 300-3 based on the center (the center of all magnets) MG of the central magnet segment region 300-2, and the three magnet segment regions 300-1, 300-2, and 300-3 are the same (MG1=MG2).

FIGS. 5A and 5B are views illustrating a structure in which the center of a central magnet polarization region, among a plurality of magnet polarization regions, coincides with the center of a corresponding coil.

Referring to FIG. 5A, in a structure in which the first polarization magnet 310 or the second polarization magnet 320 of the magnet unit 300 includes an odd number of the plurality of magnet segment regions, when located at one of both ends within the entire driving section, the center MG of the central magnet segment region 300-2, among the plurality of magnet segment regions 300-1, 300-2 and 300-3, may coincide with the center CG1 of the driving coil 400-1 facing the central magnet segment region 300-2.

Referring to FIG. 5B, when the first polarization magnet 310 or the second polarization magnet 320 of the magnet unit 300 is located at the other end of both ends within the entire driving section, the center MG of the central magnet segment region 300-2, among the plurality of magnet segment regions 300-1, 300-2, and 300-3 may coincide with the center CG4 of the driving coil 400-4 facing the central magnet segment region 300-2.

FIG. 6 is a view illustrating sizes of a plurality of coils of a coil unit.

Referring to FIG. 6, widths of the plurality of driving coils 400-1, 400-2, 400-3, and 400-4 of the first coil unit 410 or the second coil unit 420 may be equal to each other (CG1=CG2=CG3=CG4).

Widths of the plurality of magnet segment regions 300-1, 300-2, and 300-3 of the first polarization magnet 310 or the second polarization magnet 320 may be equal to each other (M1=M2=M3).

FIG. 7 is a view illustrating a gap between coils of a coil unit.

Referring to FIG. 7, for example, gaps G1, G2, and G3 between two coils adjacent to each other, among the plurality of driving coils 400-1, 400-2, . . . of the first coil unit 410 or the second coil unit 420 may be equal to each other (G1=G2=G3).

As another example, an interval ratio between two coils adjacent to each other, among the plurality of driving coils 400-1, 400-2, . . . of the first coil unit 410 or the second coil unit 420 may be included in a preset range of ratios (e.g., 0.8 to 1.2).

FIG. 8A is a view illustrating an individual coil component of a coil unit, and FIG. 8B is a view illustrating a PCB coil of a coil unit.

Referring to FIG. 8A, for example, each of the plurality of driving coils 400-1, 400-2, 400-3, and 400-4 may be an individual coil formed in a coil pattern on each of individual substrates P1, P2, P3, and P4.

Referring to FIG. 8B, the plurality of driving coils 400-1, 400-2, 400-3, and 400-4 may be integral printed circuit board (PCB) coils arranged in a row on one PCB P10.

As an example, the substrate may be a printed circuit board (PCB), or may be a board or panel on which circuits or chips may be arranged, other than the PCB.

As described above, when a high magnification is applied to the continuous zoom camera apparatus, a driving distance is lengthened, and in order to efficiently control this, gaps between the plurality of coils of the coil unit need to be uniform, and the plurality of magnet segment regions of the magnet unit and the size of the individual coil need to be designed and manufactured uniformly.

For example, when the coil gap is not uniform, the efficiency of the driving force is lowered and power consumption increases. This will be described below.

FIG. 9 is a view illustrating a first lens barrel and a second lens barrel.

Referring to FIG. 9, the first lens barrel 210 may include a first side surface portion 210-L1 and a second side surface portion 210-L2 on both sides. For example, for the arrangement of the first polarization magnet 310, a length L11 of the first side surface portion 210-L1 of the first lens barrel 210 may be longer in the optical axis direction than a length L12 of the second side surface portion 210-L2 of the second lens barrel 210 (L11>L12).

The second lens barrel 220 may include a first side surface portion 220-L1 and a second side surface portion 220-L2 on both sides. For example, for the arrangement of the second polarization magnet 320, a length L22 of the second side surface portion 210-L2 of the second lens barrel 220 may be longer in the optical axis direction than a length L21 of the first side surface portion 210-L1 of the second lens barrel 220 (L22>L21).

The first side surface portion 210-L1 of the first lens barrel 210 may extend toward the second lens barrel 220 for the arrangement of the first polarization magnet 310, and the second side surface portion 210-L2 of the second lens barrel 220 may extend toward the first lens barrel 220 for the arrangement of the second polarization magnet 320.

Due to the structures of the first side surface portion 210-L1 of the first lens barrel 210 and the second side surface portion 210-L2 of the second lens barrel 220 described above, the camera apparatus may be manufactured to have a smaller size and the first lens barrel 210 and the second lens barrel 220 may be driven without interfering with each other.

In addition, the first side surface portion 220-L1 of the second lens barrel 220 may be disposed to be opposite to the second side surface portion 210-L2 of the first lens barrel 210 based on the optical axis passing through the lens assembly 200.

As described above, the first polarization magnet 310 may be disposed on the first side surface portion 210-L1 of the first lens barrel 210, and the second polarization magnet 320 may be disposed on the second side surface portion 220-L2 of the second lens barrel 220.

FIG. 10 is a view illustrating a first coil unit and a second coil unit.

Referring to FIG. 10, each of the plurality of driving coils 410-1 to 410-4 of the first coil unit 410 or the plurality of driving coils 420-1 to 420-4 of the second coil unit 420 may be disposed to be offset toward an incident axis.

For example, as shown in FIG. 10, each of the plurality of driving coils 410-1 to 410-4 of the first coil unit 410 may be disposed to be offset in the direction of the incident axis LA-V1, and each of the plurality of driving coils 420-1 to

420-4 of the second coil unit 420 may be disposed to be offset toward an incident axis direction LA-V2.

FIG. 11A is a view illustrating a driving signal of a coil when a coil gap is not uniform, and FIG. 11B is a view illustrating a ripple of a driving signal when a coil gap is not uniform.

Referring to a lens barrel movement distance and driving force of a driving signal shown in FIGS. 11A and 11B, when the coil gap is not uniform, a driving signal as shown in FIG. 11A is supplied to the coil unit, and a relatively large ripple occurs by the driving signal of the coil as shown in FIG. 11B, so that driving force may not be optimized to make loss.

FIG. 12A is a view illustrating a driving signal of a coil when a coil gap is uniform, and FIG. 12B is a view illustrating a ripple of a driving signal when the coil gap is uniform.

Referring to a lens barrel movement distance and driving force of a driving signal shown in FIGS. 12A and 12B, when the coil gap is uniform, a driving signal as shown in FIG. 12A is supplied to the coil unit, and a relatively small ripple occurs by the driving signal of the coil as shown in FIG. 12B, so that a difference in driving force is resultantly minimized to reduce loss.

In addition, for example, a method of measuring a width of a magnet segment region according to the various examples is as follows.

(1) A magnetic fluid is thinly spread on one surface of a polarization magnet (the surface in which the plurality of magnet segment regions and a neutral zone are visible).

(2) One surface of the polarization magnet is imaged using a light source microscope.

(3) Based on the captured image, the polarization magnet is measured using a program.

(4) A width (e.g., 0.348 mm) of the neutral zone ZN of the polarization magnet, a width (e.g., 0.801 mm) of the magnet segment region, and a total width (1.96 mm) of the polarization magnet may be measured, and tolerance between the center of the neutral zone and the center of the polarization magnet may be calculated to be approximately 0.005 mm.

In this measurement, according to the measurement results of the polarization magnet in which the width of the neutral zone is 0.35 mm+0.04 and the width of the magnet segment region is 0.805, it can be seen that the measurement is performed accurately because a measurement error for the width of the magnet segment region is as small as 0.04 mm.

The circuit unit 600 of the continuous zoom camera apparatus according to the various examples herein may include a processor (e.g., a central processing unit (CPU), a graphics processing unit (GPU), a microprocessor, an application specific integrated circuit (ASIC), a field programmable gate array (FPGA), etc.), a memory (e.g., volatile memory (e.g., RAM, etc.), and a non-volatile memory (e.g., ROM, flash memory, etc.).

According to the various examples, the effect of improving the efficiency of driving force by reducing loss of driving force by optimizing the gaps between the plurality of driving coils and the size of the coils and the magnets to exhibit efficient driving.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera apparatus comprising:
a housing defining an accommodating space and an opening therein;
a lens assembly including a first lens barrel and a second lens barrel disposed in the accommodating space and configured to be movable in an optical axis direction;
a first polarization magnet including first magnet segment regions disposed on a first side of the first lens barrel with respect to the optical axis direction and a second polarization magnet including second magnet segment regions disposed on a second side of the second lens barrel with respect to the optical axis direction; and
a first coil unit including a plurality of first driving coils disposed on a first side of the housing to face the first polarization magnet through the opening of the housing and a second coil unit including a plurality of second driving coils disposed on a second side of the housing to face the second polarization magnet through the opening of the housing,
wherein a width of each one of the first driving coils or each one of the second driving coils along the optical axis direction is greater than or equal to a width of each one of the first magnet segment regions or the second magnet segment regions along the optical axis direction.

2. The camera apparatus of claim 1, wherein the first polarization magnet includes an odd number of first magnet segment regions, and the first polarization magnet has a bilateral symmetrical structure with respect to a center of a central magnet segment region among the plurality of first magnet segment regions, and
the second polarization magnet includes an odd number of second magnet segment regions, and the second polarization magnet has a bilateral symmetrical structure with respect to a center of a central magnet segment region among the plurality of second magnet segment regions.

3. The camera apparatus of claim 1, wherein
the first polarization magnet includes an odd number of first magnet segment regions, and when the first polarization magnet is located at either one of both ends of an entire driving section of the first polarization magnet, a center of a central magnet segment region, among the plurality of first magnet segment regions, coincides with a center of the respective first driving coil facing the central magnet segment region, and
the second polarization magnet includes an odd number of second magnet segment regions, and when the second polarization magnet is located at either one of both ends of an entire driving section of the second polarization magnet, a center of a central magnet segment region, among the plurality of second magnet segment regions, coincides with a center of the respective second driving coil facing the central magnet segment region.

4. The camera apparatus of claim 1, wherein
each of the plurality of first driving coils has a same width and/or each of the plurality of second driving coils has a same width, and
each of the plurality of first magnet segment regions has a same width and/or each of the plurality of second magnet segment regions has a same width.

5. The camera apparatus of claim 1, wherein gaps between adjacent first driving coils, among the plurality of first driving coils, are the same as each other, and/or gaps between adjacent second driving coils, among the plurality of second driving coils, are the same as each other.

6. The camera apparatus of claim 1, wherein an interval ratio between adjacent first driving coils, among the plurality of first driving coils, falls within a first preset ratio range, and/or an interval ratio between adjacent second driving coils, among the plurality of second driving coils, falls within a second preset ratio range.

7. The camera apparatus of claim 1, further comprising a prism configured to change incident light from an incident axis to the optical axis direction.

8. The camera apparatus of claim 1, wherein the plurality of first driving coils are individual coil components in which one first driving coil is mounted on an individual substrate or printed circuit board (PCB) coils arranged in a row on one PCB, and/or the plurality of second driving coils are individual coil components in which one second driving coil is mounted on an individual substrate or printed circuit board (PCB) coils arranged in a row on one PCB.

9. The camera apparatus of claim 1, wherein
the first lens barrel includes a first side surface portion disposed on the first side of the first lens barrel with respect to the optical axis direction and a second side surface portion disposed on s second side of the first lens barrel with respect to the optical axis direction, and
a length of the first side surface portion of the first lens barrel along the optical axis direction is greater than a length of the second side surface portion of the first lens barrel along the optical axis direction.

10. The camera apparatus of claim 9, wherein
the second lens barrel includes a first side surface portion disposed on a first side of the second lens barrel with respect to the optical axis direction and a second side surface portion disposed on the second side of the second lens barrel with respect to the optical axis direction, and
a length of the second side surface portion of the second lens barrel along the optical axis direction is greater than a length of the first side surface portion of the second lens barrel along the optical axis direction.

11. The camera apparatus of claim 9, wherein the first side surface portion of the first lens barrel extends toward the second lens barrel, and the second side surface portion of the second lens barrel extends toward the first lens barrel.

12. The camera apparatus of claim 10, wherein
the first polarization magnet is disposed on the first side surface portion of the first lens barrel, and
the second polarization magnet is disposed on the second side surface portion of the second lens barrel.

13. The camera apparatus of claim 12, wherein the first side surface portion of the first lens barrel is disposed on a side opposite to the second side surface portion of the second lens barrel with respect to an optical axis passing through the lens assembly.

14. The camera apparatus of claim 10, wherein each of the plurality of first driving coils is offset in a direction of a first incident axis, and/or each of the plurality of second driving coils is offset in a direction of a second incident axis.

15. A camera apparatus comprising:
a housing defining an accommodating space and an opening therein;
a lens assembly including a first lens barrel and a second lens barrel disposed in the accommodating space and configured to be movable in an optical axis direction;
a first polarization magnet including first magnet segment regions disposed on a first side of the first lens barrel with respect to the optical axis direction and a second polarization magnet including second magnet segment regions disposed on a second side of the second lens barrel with respect to the optical axis direction;
a first coil unit including a plurality of first driving coils disposed on a first side of the housing to face the first polarization magnet through the opening of the housing and a second coil unit including a plurality of second driving coils disposed on a second side of the housing to face the second polarization magnet through the opening of the housing; and
a circuit unit configured to control driving of the first coil unit and the second coil unit,
wherein a width of each one of the first driving coils or each one of the second driving coils along the optical axis direction is greater than or equal to a width of each one of the first magnet segment regions or the second magnet segment regions along the optical axis direction.

16. The camera apparatus of claim 15, wherein the first polarization magnet includes an odd number of first magnet segment regions, and the first polarization magnet has a bilateral symmetrical structure with respect to a center of a central magnet segment region among the plurality of first magnet segment regions, and
the second polarization magnet includes an odd number of second magnet segment regions, and the second polarization magnet has a bilateral symmetrical structure with respect to a center of a central magnet segment region among the plurality of second magnet segment regions.

17. The camera apparatus of claim 15, wherein
the first polarization magnet includes an odd number of first magnet segment regions, and when the first polarization magnet is located at either one of both ends of an entire driving section of the first polarization magnet, a center of a central magnet segment region, among the plurality of first magnet segment regions, coincides with a center of the respective first driving coil facing the central magnet segment region, and
the second polarization magnet includes an odd number of second magnet segment regions, and when the second polarization magnet is located at either one of both ends of an entire driving section of the second polarization magnet, a center of a central magnet segment region, among the plurality of second magnet segment regions, coincides with a center of the respective second driving coil facing the central magnet segment region.

18. The camera apparatus of claim 15, wherein
each of the plurality of first driving coils has a same width and/or each of the plurality of second driving coils has a same width, and
each of the plurality of first magnet segment regions has a same width and/or each of the plurality of second magnet segment regions has a same width.

19. The camera apparatus of claim 15, wherein gaps between adjacent first driving coils, among the plurality of first driving coils, are the same as each other, and/or gaps between adjacent second driving coils, among the plurality of second driving coils, are the same as each other.

20. The camera apparatus of claim 15, wherein an interval ratio between adjacent first driving coils, among the plurality of first driving coils, falls within a first preset ratio range, and/or an interval ratio between adjacent second driving coils, among the plurality of second driving coils, falls within a second preset ratio range.

21. The camera apparatus of claim 15, further comprising a prism configured to change incident light from an incident axis to the optical axis direction.

22. The camera apparatus of claim 15, wherein the plurality of first driving coils are individual coil components in which one first driving coil is mounted on an individual substrate or printed circuit board (PCB) coils arranged in a row on one PCB, and/or the plurality of second driving coils are individual coil components in which one second driving coil is mounted on an individual substrate or printed circuit board (PCB) coils arranged in a row on one PCB.

23. The camera apparatus of claim 15, wherein
the first lens barrel includes a first side surface portion disposed on the first side of the first lens barrel with respect to the optical axis direction and a second side surface portion disposed on s second side of the first lens barrel with respect to the optical axis direction, and
a length of the first side surface portion of the first lens barrel along the optical axis direction is greater than a length of the second side surface portion of the first lens barrel along the optical axis direction.

24. The camera apparatus of claim 23, wherein
the second lens barrel includes a first side surface portion disposed on a first side of the second lens barrel with respect to the optical axis direction and a second side surface portion disposed on the second side of the second lens barrel with respect to the optical axis direction, and
a length of the second side surface portion of the second lens barrel along the optical axis direction is greater than a length of the first side surface portion of the second lens barrel along the optical axis direction.

25. The camera apparatus of claim 23, wherein the first side surface portion of the first lens barrel extends toward the second lens barrel, and the second side surface portion of the second lens barrel extends toward the first lens barrel.

26. The camera apparatus of claim 24, wherein
the first polarization magnet is disposed on the first side surface portion of the first lens barrel, and
the second polarization magnet is disposed on the second side surface portion of the second lens barrel.

27. The camera apparatus of claim 24, wherein the first side surface portion of the first lens barrel is disposed on a side opposite to the second side surface portion of the second lens barrel with respect to an optical axis passing through the lens assembly.

28. The camera apparatus of claim 14, wherein each of the plurality of first driving coils is disposed be offset in a direction of a first incident axis, and/or each of the plurality of second driving coils is disposed be offset in a direction of a second incident axis.

* * * * *